Oct. 9, 1928.  1,686,682
C. L. COUGHLIN
CLUTCH MECHANISM
Original Filed May 14, 1926
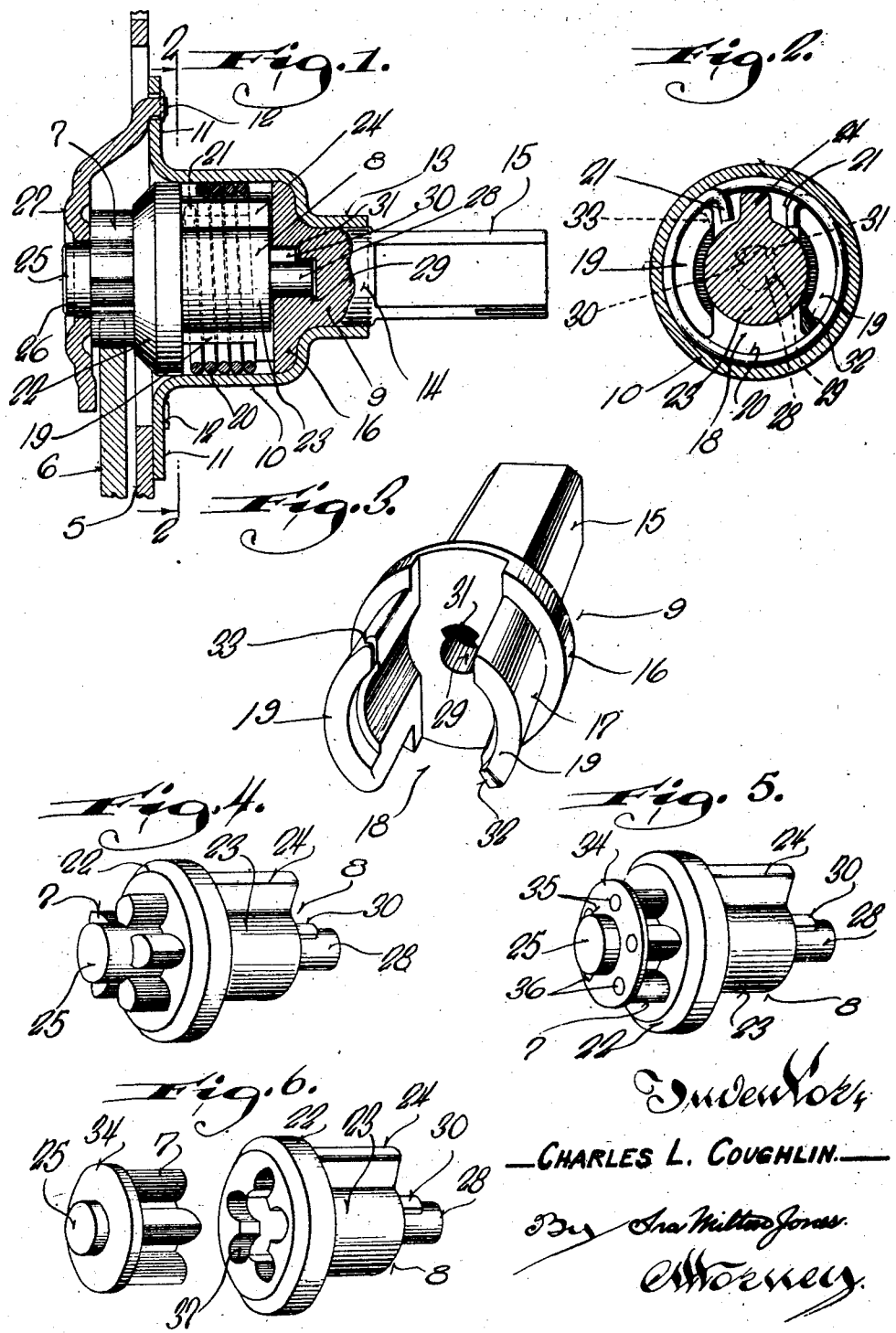
Inventor
CHARLES L. COUGHLIN
By Ira Milton Jones
Attorney Patented Oct. 9, 1928.

1,686,682

UNITED STATES PATENT OFFICE.

CHARLES L. COUGHLIN, OF MILWAUKEE, WISCONSIN, ASSIGNOR TO BRIGGS AND STRATTON CORPORATION, OF MILWAUKEE, WISCONSIN, A CORPORATION OF DELAWARE.

CLUTCH MECHANISM.

Application filed May 14, 1926, Serial No. 109,101. Renewed February 8, 1928.

This invention refers more particularly to a clutch mechanism especially designed for use with window regulators and is especially directed to devices of the character illustrated in the copending application of Stephen F. Briggs.

In the production of devices of the character described, it is important that the structure and the manufacturing processes be simplified, to effect economies in manufacture and prevent all possible human error in assembling. Having this in mind, it is an object of my invention to provide an improved clutch device of the character described wherein the clutch device proper is formed of four parts, viz: an exterior housing or casing forming the brake drum, a driving member and its integral associated parts, a driven member and its associated integral parts, and a coiled brake spring.

Another object of this invention resides in the provision of an improved clutch mechanism of the character described, in which the driving member and its associated parts are formed by die casting and likewise the driven member and its associated parts are formed by die castings.

It is a further object of this invention to provide an improved clutch mechanism of the character described wherein the driving and driven members are so constructed that when assembled the two are connected by a part carried by one member and extended into an opening in the other to provide a bearing therebetween, the bearing, if desired, having means for preventing the wrong assembling of the parts.

It is a further object of this invention to provide an improved clutch mechanism of the character described wherein the edges of the driving member lugs have means for preventing the mounting of the brake spring thereon in any way other than with its inturned ends engaged over predetermined edges of the lugs to preclude the improper assembling of the clutch mechanism.

And a still further object of this invention resides in the provision of an improved, die cast, driven member having its pinion gear strengthened by a shroud or guard plate of a metal having greater tensile strength to thus prevent any possible destruction of the pinion gear due to the rough usage to which the same may be subjected.

With the above and other objects in view, which will appear as a description proceeds, my invention resides in the novel construction, combination and arrangement of parts substantially as hereinafter described and more particularly defined by the appended claims, it being understood that such changes in the precise embodiment of the herein disclosed invention may be made as come within the scope of the appended claims.

In the accompanying drawing, I have illustrated several complete examples of the physical embodiment of my invention constructed according to the best modes I have so far devised for the practical application of the principles thereof, and in which:

Figure 1 is a view taken through an improved clutch mechanism embodying my invention, parts thereof being in side elevation and parts in section;

Figure 2 is a view taken transversely through Figure 1 on the plane of the line 2—2;

Figure 3 is a perspective view of the driving member assembly, the same being illustrated apart from the clutch mechanism assembly;

Figure 4 is a perspective view of one form of driven member assembly embodying my invention, the same being illustrated apart from the clutch mechanism assembly;

Figure 5 is a view similar to Figure 4 illustrating a slightly modified form of driven member wherein the pinion gear teeth are reinforced by a shroud plate, and Figure 6 is a view similar to Figure 5 of a modified form of driven member.

Referring now more particularly to the accompanying drawings in which like numerals designate like parts throughout the several views, 5 designates the bracket member of a window regulating mechanism adapted to be mounted from the customary lock board or transverse braces, not shown, of an automotive vehicle door frame, and 6 a segmental gear journaled thereon and carrying a window operating arm, not shown, for transmitting the rotational movement of the segmental gear to opening and closing movements of a door or window member, not shown. The window regulator per se may be of any desired construction, and in the present illustration, the segmental gear is operated from a pinion gear 7 carried by a driven member 8 which is actuated by a driving member 9 operated by a suitable handle or crank member, not shown.

The driving and driven members are operatively connected in a cup-shaped casing 10 forming a brake housing and have a brake mechanism connected therewith to permit unrestricted operation of the device when rotational stress is applied to the driving member, but to oppose operation when rotational stress is applied to the driven member, as a strain on the window member. In the present embodiment, the brake housing is preferably formed in one piece and is of substantially cup shape, with its outer peripheral rim flanged laterally, as at 11, and riveted or otherwise secured to the bracket 5, as at 12. The closed end of the brake housing is formed with a central sleeve or bearing 13 in which the journal portion 14 of the driving member shaft 15 is rotatable.

The inner end of the driving member shaft located within the housing 10 is formed with a flange or collar member 16 and a cup shaped member 17, the opposed walls of the member 17 being slotted, as at 18, to define two spaced lugs 19. The outer peripheral surfaces of the lugs 19 form a drum about which a spring 20 is coiled, the ends of which are inturned, as at 21, into one of the slots between adjacent ends of the lugs.

The driving member, as above described, is preferably die cast in one piece and the driven member is likewise die cast integral with the pinion gear and consists of a collar or flange 22 which fits in the open end of the brake housing and from the side of which opposed to the pinion gear extends a stub member 23 which projects between the lugs of the driving member and carries a driving key 24 adapted to be engaged between the spring ends and the adjacent ends of the lugs 19. A journal 25 is integral with and projects outwardly from the pinion gear for engagement in a bearing 26 formed in a portion 27 pressed from the bracket 5 to form a guideway in which the toothed edge of the segmental gear is guided.

With the driving member and driven member assembled within the brake housing, a spool shaped drum is provided about which the spring 20 is coiled, the flanges 16 and 22 securing the spring against exerting an end thrust on a stationary part while the window member, not shown, is being operated. The spring 20 is normally under tension with its ends closer than the width of the slot between the driving member lugs so that the periphery of the spring normally frictionally contacts with the brake housing wall. A rotational stress applied to the driving member engages the end of the lug 19 leading the direction of rotation with the adjacent spring inturned end and the driving key 24, tending to coil the spring about the driving member and decreasing its frictional contact with the wall of the brake housing, permitting unrestricted rotation of the driving member and consequently the driven member to manipulate the window, not shown, through the pinion 7, segmental gear 6, and the window operating arm, not shown, connected therewith. A rotational stress applied to the driven member, as by a downward jarring of the window member, not shown, or an attempt to open the same by exerting a downward movement thereon, causes the driving key 24 of the driven member to engage the inturned end of the spring leading the direction of rotation and tends to spread the ends of the spring increasing its frictional contact with the brake housing wall and thus firmly securing the mechanism against rotation.

The projection 23 of the driven member has a short stub shaft 28 extended from its inner end which is journaled in an opening 29 in the end of the flange or collar member 16 to provide a bearing support between the two members. The stub shaft 28 preferably has an offset portion 30 formed thereon at its base which cooperates with an offset 31 in the opening 29 to prevent the improper assembling of the driving and driven members.

One end of one lug 19 is tapered or rounded, as at 32, to prevent the improper placing of the spring on the driving member lugs and the opposite end of the next lug is notched, as at 33, to receive the adjacent inturned ends of the spring, as shown in Figure 2. It will be thus apparent that the rounded end 32 of one of the lugs 19 and the key or offset 30 on the stub shaft 28 cooperate to eliminate all possibility of wrong assembling of the device and further that the shaft 28 having a bearing in the opening 29 maintains the driving member and driven member in proper concentric position.

Actual experience has proven the device illustrated to have ample strength to withstand the severe usage to which devices of this character are subjected, but if desired, the gear 7 may be reinforced by a shroud plate or washer 34 fitted over the journal 25 and having a plurality of openings 35 therein to receive tits or lugs 36 formed integral with the gear, as best illustrated in Figure 5. In this construction the teeth of the pinion gear are shrouded by a metal washer having greater tensile strength than that of die cast metal to thus prevent any possibility of chipping or breaking off of the gear teeth.

In Figure 6, the driven member is die cast or otherwise formed in two pieces, the pinion gear 7, journal 25 and shroud plate 34 being integral, and the flange 22, stub member 23 and key 24 being integral. The outer face of the flange 22 is recessed, as at 37, complementary to the inner end of the gear 7, which is pressed therein to form the driven member assembly.

From the foregoing description taken in connection with the accompanying drawing, it will be readily apparent to those skilled in the art to which an invention of the character appertains, that I have provided an improved clutch mechanism especially designed for use in connection with window regulators of automotive vehicles wherein a minimum number of parts are necessary and the parts are so arranged that their disconnection and improper assembling is prevented. It will also be apparent that I provide a novel and improved clutch mechanism which readily lends itself to quantity production without the sacrifice of efficiency in operation.

What I claim as my invention is:

1. In a device of the character described, a normally stationary housing, a rotatable driving member formed in one piece and consisting of a shaft portion, a flange on the inner end thereof, a pair of spaced lugs projected from the flange and having their peripheries struck on an arc having the axis of the shaft portion as a center and a journal portion formed on the shaft juxta-posed the flange, a bearing member at the closed end of the stationary housing in which the journal portion of the shaft is journaled, the flange and lugs of the driving member being located within the housing, a rotatable driven member consisting of a part located within the housing between the lugs of the driving member and a driving key carried thereby and having an end located between adjacent ends of the driving member lugs, and a spring coiled about the lugs of the driving member with its ends inturned between adjacent ends of the lugs and disposed at opposite sides of the driving key, the peripheral surface of the spring normally frictionally gripping the wall of the housing to resist rotation of the driving member therein, whereby rotational stress applied to the driving member draws the spring ends together to reduce the frictional contact between the spring and housing and rotational stress applied to the driven member tends to spread the inturned ends of the spring to increase its frictional contact with the housing.

2. In a device of the character described, a normally stationary housing, a rotatable driving member having one end located within the housing and including a shaft having its inner end extended into the housing, a flange on the inner end of the shaft and a cup member extended axially from the flange and having its wall slotted to form two complementary abutments, a spring coiled about the cup member with its ends inturned between the abutments, and a rotatable driven member having one end located in the housing and including a stub shaft extended into the space between the driving member lugs, a flange on the outer end of said shaft and closing the open end of the brake housing and a driving key carried by the stub shaft and engaged between the inturned ends of the spring and the abutments, the shaft, flange and driving key being formed in one piece, rotational stress applied to the driving member tending to contract the spring ends to reduce the frictional contact between the spring and housing and a rotational stress applied to the driven member tending to spread the ends of the spring to increase its frictional contact with the housing.

3. In a device of the character described, a normally stationary housing, a rotatable driving member having one end located within the housing and including a shaft having its inner end extended into the housing, a flange on the inner end of the shaft and a cup member extended axially from the flange and having its wall slotted to form two abutments, a spring coiled about the cup member with its ends inturned between the abutments, and a rotatable driven member having one end located in the housing and including a stub shaft extended into the space between the driving member lugs, a flange on the outer end of said shaft and closing the open end of the brake housing, a driving key carried by the stub shaft and engaged between the inturned ends of the spring and the abutments and a pinion gear on the flange outwardly of the housing, the driven member shaft, flange, driving key and pinion gear being formed in one piece, rotational stress applied to the driving member tending to contract the spring ends to reduce the frictional contact between the spring and housing and rotational stress applied to the driven member tending to spread the ends of the spring to increase its frictional contact with the housing.

4. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends inturned between adjacent ends of the lugs, the peripheral surface of the spring normally frictionally gripping the wall of the housing to resist rotation of the driving member therein, a driving key carried by the driven member and engageable between the inturned ends of the spring and the adjacent lug ends, whereby rotational stress applied to the driving member contracts the spring ends and reduces the frictional contact between the spring and housing and rotates the driven member and a rotational stress applied to the driven member spreads the inturned ends of the spring to increase its frictional contact with the housing and resist rotation of the member, and a stub shaft extended from the inner end of the driven member and having a bearing in a recess in the inner end of the driving member, the component parts of the driven member being formed in one piece.

5. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends inturned between adjacent ends of the lugs, the peripheral surface of the spring normally frictionally gripping the wall of the housing to resist rotation of the driving member therein, a driving key carried by the driven member and engageable between the inturned ends of the spring and the adjacent lug ends, whereby rotational stress applied to the driving member draws the spring ends together to reduce the frictional contact between the spring and housing and rotates the driven member and a rotational stress applied to the driven member tends to spread the inturned ends of the spring to increase its frictional contact with the housing and prevent rotation of the member, and a stud shaft extended from the inner end of the driven member and having a bearing in a recess in the inner end of the driving member.

6. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends inturned between adjacent ends of the lugs, the peripheral surface of the spring normally frictionally gripping the wall of the housing to resist rotation of a driving member, a driving key carried by the driven member and disposed between the inturned ends of the spring and the adjacent lug ends whereby rotational stress applied to the driving member contracts the spring ends to reduce the frictional contact between the spring and housing and a rotational stress applied to the driven member spreads the inturned ends of the spring to increase its frictional contact with the housing and resist the rotation of the member, and means preventing the assembling of the device in any way other than with the driving key engaged between the inturned ends of the spring and the adjacent ends of the lugs.

7. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends inturned between adjacent ends of the lugs, the peripheral surface of the spring normally frictionally gripping the wall of the housing to resist rotation of the driving member therein, a driving key carried by the driven member and engageable between the inturned ends of the spring and the adjacent lug ends, whereby rotational stress applied to the driving member draws the spring ends together to reduce the frictional contact between the spring and housing and rotates the driven member and a rotational stress applied to the driven member tends to spread the inturned ends of the spring to increase its frictional contact with the housing and prevent rotation of the member, a stud shaft extended from the inner end of the driven member and having a bearing in a recess in the inner end of the driving member, and cooperating means between the stud shaft and the driving member recess for preventing the assembling of the device other than with the driving key located between the ends of the lugs between which the spring ends are located.

8. In a device of the character described, a normally stationary housing, a rotatable driving member having one end located within the housing, a rotatable driven member having one end located within the housing, a pair of spaced lugs carried by the end of the driving member within the housing, a spring coiled about the lugs of the driving member with its ends inturned between adjacent ends of the lugs, the peripheral surface of the spring normally frictionally gripping the wall of the housing to resist rotation of the driving member therein, a driving key carried by the driven member and engageable between the inturned ends of the spring and the adjacent lug ends, whereby rotational stress applied to the driving member contracts the spring ends to reduce the frictional contact between the spring and housing and rotates the driven member and a rotational stress applied to the driven member spreads the inturned ends of the spring to increase its frictional contact with the housing and resist rotation of the member, a stud shaft extended from the inner end of the driven member and having a bearing in a recess in the inner end of the driving member, and means incorporated in the driving member to prevent the securement of the spring over its lugs except with its inturned ends engaged over predetermined adjacent ends of the lugs.

9. In a device of the character described, a normally stationary housing, a rotatable driving member having one end located within the housing and including a shaft having its inner end extended into the housing, a flange on the inner end of the shaft and two complementary lugs extended axially from the flange, a spring coiled about the lugs with its ends inturned between adjacent ends of the lugs, a rotatable driven member having one end located in the housing and including a stub shaft extended into the space between the driving member lugs, a flange on the outer end of said shaft and closing the open end of the brake housing, a driving key carried by the stub shaft and engaged between the inturned ends of the spring and the adjacent lug ends and a pinion gear on the flange outwardly of the housing, the driven member shaft, flange, driving key and pinion gear being die cast in one piece, and a shroud plate at the outer end of the gear to reinforce the same, rotational stress applied to the driving member tending to contract the spring ends to reduce the frictional contact between the spring and housing and a rotational stress applied to the driven member tending to spread the ends of the spring to increase its frictional contact with the housing.

10. In a device of the character described, a normally stationary housing, a driving member extended into the housing, a driven member extended into the housing, a drive connection between the members and located within the housing, a pinion gear die cast integral with the driven member, a tit on the outer end of each pinion gear tooth, and a shroud plate having a plurality of openings adapted to receive the tits on the pinion gear teeth, said tits being burred over the plate to secure the same in place.

11. In a device of the character described, a normally stationary housing, a rotatable driving member formed in one piece and consisting of a shaft portion, a flange on the inner end thereof and a cylindrical projection extended from the flange and having a longitudinal slot therein, a bearing member at the closed end of the stationary housing in which the portion of the shaft adjacent the flange is journaled, the driving member flange and projection being located within the housing, a rotatable driven member consisting of a part located within the housing and a driving element extended between the adjacent edges of the driving member projection slot, and a spring coiled about the driving member projection with its ends inturned into said slot and disposed at opposite sides of the driving element, the peripheral surface of the spring normally frictionally gripping the wall of the housing to resist rotation of the driving member therein whereby rotational stress applied to the driving member draws the spring ends together to reduce the frictional contact between the spring and housing and rotational stress applied to the driven member tends to spread the inturned ends of the spring to increase its frictional contact with the housing.

12. In a device of the character described, a normally stationary housing, a rotatable driving member formed in one piece and consisting of a shaft portion, a flange on the inner end thereof and a cylindrical projection extended from the flange and having a longitudinal slot therein, a bearing member at the closed end of the stationary housing in which the portion of the shaft adjacent the flange is journaled, the driving member flange and projection being located within the housing, a rotatable driven member formed in one piece and consisting of a part located within the housing, a driving element extended between the adjacent edges of the driving member projection slot, a flange disposed exteriorally of the housing and a spur gear projected from the driven member flange, and a spring coiled about the driving member projection with its ends inturned into said slot and disposed at opposite sides of the driving element, the peripheral surface of the spring normally frictionally gripping the wall of the housing to resist rotation of the driving member therein whereby rotational stress applied to the driving member draws the spring ends together to reduce the frictional contact between the spring and housing and rotational stress applied to the driven member tends to spread the inturned ends of the spring to increase its frictonal contact with the housing.

In testimony whereof I hereunto affix my signature.

CHARLES L. COUGHLIN.